United States Patent [19]

Shiraishi et al.

[11] Patent Number: 5,928,772
[45] Date of Patent: Jul. 27, 1999

[54] PANEL MATERIAL AND METHOD OF MANUFACTURING THE SAME

[75] Inventors: Kouji Shiraishi, Izumiotsu; Hiroshi Tamura, Wakayama; Harunori Kominami, Takarazuka, all of Japan

[73] Assignee: Dainippon Ink and Chemicals, Inc., Tokyo, Japan

[21] Appl. No.: 09/011,226

[22] PCT Filed: Jun. 13, 1997

[86] PCT No.: PCT/JP97/02045

§ 371 Date: Feb. 9, 1998

§ 102(e) Date: Feb. 9, 1998

[87] PCT Pub. No.: WO97/47466

PCT Pub. Date: Dec. 18, 1997

[30] Foreign Application Priority Data

Jun. 13, 1996 [JP] Japan .................................. 8-152250

[51] Int. Cl.$^6$ ................................ B32B 5/18; B32B 5/26; E04F 15/10
[52] U.S. Cl. ........................... 428/297.4; 156/78; 156/79; 156/250; 264/45.1; 428/299.4; 428/319.1; 428/319.3
[58] Field of Search ............................. 428/297.4, 299.4, 428/319.1, 319.3; 156/78, 79, 250; 264/45.1, 45.8; 442/221, 370

[56] References Cited

U.S. PATENT DOCUMENTS 3,859,401  1/1975  Gallap et al. ........................ 264/45.3
4,091,142  5/1978  Elmore et al. ........................ 428/322

FOREIGN PATENT DOCUMENTS 50-100213  8/1975  Japan .
52-63979   5/1977  Japan .
56-48968   4/1981  Japan .

*Primary Examiner*—Blaine Copenheaver
*Attorney, Agent, or Firm*—Armstrong, Westerman, Hattori, McLeland & Naughton

[57] ABSTRACT

The panel material of the present invention comprises (A) two sheets of FRP molded board as upper and lower surface materials, and, as a core material, (B) a high density, rigid polyurethane foam layer which has been obtained by injecting a rigid polyurethane foam starting material between these two sheets of FRP molded board and allowing this starting material to foam, and which has a closed cell structure and a density of 0.2~0.5 g/cm$^3$. In addition, the manufacturing method of the panel material of the present invention includes a process for obtaining an integrally molded sandwich panel by injecting a rigid polyurethane foam starting material into a space between two sheets of FRP molded board which have been set in a mold, and allowing it to foam; and a process in which panel material is made by cutting this sandwich panel to a desired size. The panel material of the present invention is particularly suitable for use as flooring in vehicles such as trucks, buses, railway rolling stock, freight containers, and the like.

7 Claims, No Drawings

PANEL MATERIAL AND METHOD OF MANUFACTURING THE SAME

TECHNICAL FIELD

The present invention relates to a panel material and a manufacturing method therefor. This panel material is superior in its light weight properties, rigidity, and impact resistance. Furthermore, it is superior in properties for processing by a cutting and properties for fixation by a screw, and it can be easily cut to a desired size. In more detail, the present invention relates to a panel material for use as a flooring material for vehicles such as trucks, buses, railway rolling stock, freight containers and the like; and to a manufacturing method for this panel material.

BACKGROUND OF THE INVENTION

Conventionally, as is known, timber has been widely used as the material for vehicle parts such as flooring, walls and roofing. However, in recent years, regulation of the felling of tropical and subtropical forests has been strengthened from the perspective of environmental protection, and the use of timber even for vehicle parts is also becoming difficult. In addition, with regard to transportation vehicles such as trucks, buses, railway rolling stock, freight containers and the like, in response to recent improvements in transportation and to the strengthening of legal regulations, increases in load capacity are demanded, and, in particular, with regard to trucks, in the 1994 revision of the Road Traffic Act in Japan, controls on overloading were strengthened, and increases in load capacity by means of weight reduction of vehicle materials are pressing.

As a result, in recent years, an aluminum honeycomb panel and the like have become used in large quantities in vehicle materials with the goal of weight reduction and increased rigidity. However, an aluminum honeycomb panel not only increase costs, but it is difficult to cut to the desired size, and there is the processing problem that, as it is, it cannot be held to the frame using screws, therefore, it is not coming into wide use as material which replaces timber.

In addition, when used as a flooring material for vehicles, an aluminum honeycomb panel is weak with regard to concentrated loads; when a load is concentrated on a small area, that area becomes dented, and therefore, it is unable to withstand practical use.

For this reason, the use of resin foams, which are sometimes called synthetic woods as flooring for vehicles has also been proposed. These are reinforced and their rigidity increased by glass fibers within the resin foam, however, this is not sufficient, and to cover the lack in rigidity, they are generally made thicker. For this reason, even though the specific weight of the resin foam itself is low, by weight per unit of area, the weight reduction is not always sufficient. In addition, the hardness of the surface of resin foams is low and this is unfavorable from the point of view of durability. There is also a problem with properties for fixation by screws such that screws are not very effective at holding the resin foams to a frame during installation.

An objective of the present invention is the development of a flooring material for vehicles which eliminates these problems, is superior in its light weight properties, rigidity, and impact resistance, and is superior in its cutting processability such that it can be freely cut into members of desired size and in its properties for fixation by screw such that it can be held in place by screws.

DISCLOSURE OF THE INVENTION

As a result of conducting research on various aspect of the above mentioned problems, the inventors of the present invention have reached the perfection of the present invention by means of a special foam which does not contain reinforcing fiber materials and surface material manufactured from fiber reinforced plastic (FRP).

In more detail, the present invention provides a panel material comprising (A) two sheets of molded FRP board as the upper and lower surface material and, (B) a high density, rigid polyurethane foam, which is a closed cell foam and has a density of 0.2–0.5 g/cm$^3$, which forms the core material between the upper and lower surface members by injection and foaming. In addition, the present invention also provides a manufacturing method for panel material comprising the process of molding an integrated body wherein a rigid polyurethane foam starting material is injected into and allowed to foam in the space between two sheets of FRP molded board which have been placed in a mold, and a process of cutting the thus obtained sandwich panel into the desired size, wherein the specific gravity of the panel material is preferably 0.3 to less than 0.6. It is possible to carry out processes such as cutting and making holes easily on the panel material on site; the FRP molded sheet (A) preferably uses at least one layer of cloth reinforcing fiber material as the reinforcing fiber material, and uses a heat curable resin as the matrix resin; since the high density, rigid polyurethane foam (B) does not contain reinforcing fiber material, it is preferable that the flexural modulus be 14–200 kgf/mm$^2$, and that the reduction in thickness be 10% or greater after the foam has been compressed to 50% deformation and then the compression pressure released. It is preferable that the heat curable resin of the FRP molded boards (A) be a radical polymerizable unsaturated resin, and that the weight of the reinforcing fiber material is 100–800 g/m$^2$ per sheet of fiber material and a plurality of sheets of fiber material are used such that the total amount of fiber per FRP molded board is 800–1700 g/m$^2$; the thickness of the FRP molded board (A) is 0.6 to less than 3.0 mm per board, and the thickness of the rigid urethane foam (B) is 5–24 mm. The panel material is preferable for flooring for vehicles; and the vehicles are vehicles for transportation such as trucks, buses, railway rolling stock, freight containers and the like.

BEST MODE FOR CARRYING OUT THE INVENTION

The FRP molded board used in the present invention is preferably a board formed by impregnating the reinforcing fiber material with a heat curable resin, and allowing it to harden. As the heat curable resin, for example, unsaturated polyester resin, phenol resin, epoxy resin, and vinylester resin can be mentioned, and, more preferable are radical polymerizable unsaturated resins (for example, unsaturated polyester resin), and vinyl ester resins (for example, epoxy acrylate resin, urethane acrylate resin, and unsaturated polyester acrylate resin). This FRP molded board is a molded board which has superior characteristics from the point of view of mechanical properties, such as surface hardness, flexural modulus and the like, and from the point of view of ease of carrying out operations such as cutting on site; and which preferably uses an unsaturated polyester type resin and, additionally, a resin of the type which hardens after being impregnated is preferable from the point of view of physical properties.

As the reinforcing fiber material used in the FRP molded board, preferably glass fibers are used, but, of course, in order to further lighten weight, carbon fibers, organic type high modulus fibers such as aramid fiber, non-woven fabric and the like can be used, or the use of these together with glass fibers is also possible.

With regard to the form of the reinforcing fiber material which is used in the FRP molded board, for example, chopped strand mat, roving, roving cloth, cloth, and the like can be mentioned, and any of these can be used, but when the present invention is being used as vehicle flooring, in order to withstand localized loads, the provision of at least one layer of cloth (mesh) reinforcing fiber material is preferable. As the cloth reinforcing fiber material, glass cloth and roving cloth are preferably mentioned.

With regard to the reinforcing fiber material of the present invention, it is preferable to use a plurality of sheets of reinforcing fiber material such that the total fiber content used is 800–1700 g/m$^2$ per FRP molded board, and such that the fiber content per sheet of fiber material is 100–800 g/m$^2$. It is preferable that a combination of mat form and cloth form be used. The mat form is preferably one sheet of chopped strand mat having a fiber content of 150–600 g/m$^2$, and the cloth form is preferably one sheet of roving cloth having a fiber content of 100–800 g/m$^2$.

The proportion of reinforcing fiber material used in the FRP molded board is preferably between 20–70% by weight, and more preferably 30–50%. These values are also suitable when carbon fibers, organic type high modulus fibers such as aramid fibers, non-woven fabric are used, or when they are used in combination. When the proportion of reinforcing fiber material is less than 20%, it is not possible to obtain a satisfactory flexural modulus, and when it is greater than 70% impact resistance is degraded, therefore, these conditions are not desirable.

The thickness of the FRP molded board is preferably 0.6 mm or greater and less than 3.0 mm. When it is less than this, there are problems with impact resistance and flexural properties, and when it is thicker than this, use as flooring for vehicles is difficult from the point of view of weight, cost and the like.

The manufacturing method for the FRP molded board is not particularly limited, and those manufactured by means of known methods can be used without problem. As an example of an outline of this manufacturing method, firstly, a glass mat or the like is impregnated with a heat curable resin such as unsaturated polyester resin, then, this is cured for one hour in a drying oven at 60° C., and then removed from the mold and cut to the desired dimensions to give a board which can be used.

It is preferable for the FRP molded board and the rigid polyurethane foam to adhere directly, and for FRP molded boards which have poor adhesive properties, it is preferable to apply a primer or to sand the contact surface for the core material in advance. This is for the purpose of improving the adhesive properties of the FRP molded board which is the surface material and the rigid urethane foam during the process in which the rigid polyurethane foam starting material is injected and foams.

As the core material, there is rigid polyurethane foam, but to achieve the necessary objectives of the present invention, superior processing properties, mechanical strength, particularly, flexural strength, and flexural modulus are required and, therefore, the rigid polyurethane foam is a closed cell type.

Since the rigid polyurethane foam does not contain reinforcing fiber material, it is preferable for the flexural modulus to be 14–200 Kgf/mm$^2$, and for the reduction in thickness to be 10% or greater after the foam has been compressed to 50% deformation and then the compression pressure released.

The rigid polyurethane foam starting material used in the present invention refers to starting material for manufacturing rigid polyurethane foam or rigid urethane modified polyisocyanurate foam. These are preferably obtained from polyol compounds and polyisocyanates.

Here, the polyol compound which is used in the present invention refers, in the main, to compositions comprising polyol, catalyst, bubble size controlling agents, foaming agents, flame retardants, and the like.

From among these, firstly, as the above-mentioned polyol, for example, substances having a structure in which an alkylene oxide is added to a compound having at least two activated hydrogen atoms, or the like, or various polvetherpolyols which are mixtures of these substances; polyesterpolyols prepared from polyhydric alcohol and polycarboxylic acid or lactone compounds; and, additionally, polyetheresterpolyols having both ether linkages and ester linkages can be mentioned.

As the polyetherpolyol, giving only particular representative examples, there are compounds in a form obtained by adding initiators to any type of alkylene oxides, such as ethylene oxide, propylene oxide and butylene oxide, wherein polyhydric alcohols, polyhydric phenols, and amines can be used respectively as the initiator.

In addition, as the initiators used in these polyetherpolyols, giving only particular representative examples, firstly, as the polyhydric alcohol, there are, to start with, various dihydric alcohols such as ethylene glycol, propylene glycol, butanediol, hexanediol, diethylene glycol, neopentyl glycol, or 3-methyl-1,5-pentanediol; in addition, there are various trihydric alcohols such as glycerin, trimethylolpropane, hexanetriol, or trimethylolethane; and various tetravalent or greater alcohols such as pentaerythritol, sorbitol, methylglucoside, or cane sugar. As the polyhydric phenol, there are compounds such as pyrogallol or hydroquinone; or there are, in addition to these, various compounds such as various bisphenols such as bishpenol A.

In addition, as the polycarboxylic acid, giving only particular representative examples, there are various aliphatic polycarboxylic acids such as succinic acid, oxalic acid, or adipic acid; and various aromatic polycarboxylic acids such as phthalic acid, trimellitic acid, or HET acid.

In addition, as the amine, giving only particular representative examples, there are various monoamines such as ammonium, alkylamine or aniline; various polyamines such as ethylenediamine, diethylenetriamine, tolylenediamine, piperazine, diaminodiphenylmethane, or aminoethylpiperazine; and various alkanolamines such as monoethanolamine, diethanolamine, triethanolamine, monopropanolamine, dipropanolamine or tripropanolamine.

As the polyesterpolyol, giving only particular representative examples, as the glycol component, various dihydric alcohols such as ethylene glycol, propylene glycol, butanediol, hexanediol, diethylene glycol, dipropylene glycol, neopentyl glycol, or 3-methyl-1,5-pentanediol; various trihydric alcohols such as glycerin, trimethylolpropane or trimethylolethane; or various tetravalent or greater polyhydric alcohols such as pentaerythritol, or the like can be used. In addition, as the carboxylic acid component, those which have a form which can be obtained by using various aliphatic polycarboxylic acids such as succinic acid, oxalic acid, or adipic acid; or various aromatic polycarboxylic acids such as phthalic acid, trimellitic acid, or HET acid can be mentioned.

In the manufacture of the polyetheresterpolyol, for example, a polyol can be used which has a combination within the molecule of ether linkages and ester linkages, and which is obtained by using the above-mentioned various starting materials.

From among these, polyetherpolyols having a form obtained using aliphatic compounds as initiators are preferable, and polyetherpolyols having a form obtained using polyhydric alcohols or amines as initiators are more preferable, and various polyetherpolyols such as those mentioned above which have a hydroxyl value of 700 (mg KOH/g) or less are even more preferable.

Polyol compounds in a form which uses 20% by weight or greater of this polyetherpolyol are superior in compatibility with fluorine halogenated hydrocarbon foaming agents, and are, therefore, particularly preferable.

As the foaming agents, water which is a kind of reactive foaming agent and fluorine containing hydrocarbons or fluorine halogenated hydrocarbons which have, in accordance with need, at least one hydrogen atom within the molecule can also be used. As the relevant fluorine containing (halogenated) hydrocarbon, giving only representative examples, trifluoromethane, difluoromethane, pentafluoroethane, difluoroethane, dichloromonofluoromethane, monochloromonofluoromethane, monochlorodifluoromethane, dichlorotrifluoroethane, dichlorofluoroethane, monochlorotetrafluoroethane, monochlorodifluoromethane, monochlorodifluoroethane, and the like can be used.

In addition, it is also possible to use halogenated hydrocarbons, such as methylenechloride, which have low boiling points in combination with the above.

As the above-mentioned polyisocyanate which is used in the present invention, giving only particular representative examples, various aliphatic type polyisocyanates such as hexamethylene diisocyanate; various alicyclic isocyanates such as hydrogenated diphenylmethane diisocyanate or isophorone diisocyanate; various aromatic isocyanates such as tolylene diisocyanate (TDI) and diphenylmethane diisocyanate (MDI); in addition, crude TDI; crude MDI; isocyanate modified prepolymers; or isocyanurate modified prepolymers; and the like can be mentioned.

In addition, as the above-mentioned catalyst used in the present invention, giving only particular representative examples, various amine type catalysts such as hexamethylenediamine, pentamethyldiethyltriamine, or imdazol; catalysts for manufacturing various urethane modified polyisocyanurates/foams such as potassium octylate and triazine; and metal containing catalysts such as dibutyltindilaurate (DBTL) and the like can be mentioned.

The rigid polyurethane foam (B) used in the present invention has a density of 0.2–0.5 g/cm$^3$. When the density is lower than this, the strength of the foam is reduced, therefore, the flexural modulus, flexural strength, etc., of the panel material (and, in particular, of the flooring material for vehicles) of the present invention are reduced, and, in addition, buckling occurs in the foam layer under concentrated loads. On the other hand, when the density of the foam layer is greater than 0.5 g/cm$^3$, the weight of the panel material of the present invention increases, particularly when it is used for flooring for vehicles, and this is also not desirable from the point of view of cost. A density of 0.25–0.35 g/cm$^3$ is even more preferable.

In addition, a closed cell structure is preferable mainly from the point of view of mechanical strength. The closed cell ratio is preferably 80% or greater and even more preferably 90% or greater. In addition, the cell size of the rigid polyurethane foam is not particularly limited, but a cell diameter of 1–1000 microns is good from the point of view of strength, molding properties, and the like.

The thickness of the high density, rigid polyurethane foam of the core material used in the present invention is determined by considering the thickness of the finally obtained panel and the thickness of the FRP molded board, and is preferably 5–24 mm.

The thickness of the panel material of the present invention is preferably 10–30 mm. When the thickness of the panel material is greater than this, not only is the weight increased, but it is disadvantageous from the point of view of capacity, and cost increase, therefore, this condition is not desirable. If the thickness of the panel material is made thinner than this, there are problems from the point of view of strength and from the point of view of bending. The specific gravity of the panel is preferably 0.3 to less than 0.6. If the specific gravity is greater than this the light weight property is degraded.

In the manufacturing method of the panel material of the present invention, two sheets of FRP molded board are set, using spacers, at the desired spacing which corresponds to the desired thickness for the panel material in a box mold maintained at a temperature of preferably 30–70° C. Next, the above-mentioned rigid polyurethane foam starting material is injected into the space therebetween and is allowed to foam to a predetermined expansion ratio, preferably 2–10 times, within the mold. After the foam of the above-mentioned polyurethane foam starting material has hardened, a sandwich panel material is removed from the above-mentioned box shaped mold and this sandwich panel material has an FRP molded board/rigid polyurethane foam layer/FRP molded board structure and is the starting material for the flooring for vehicles.

Next, the panel material is made by cutting this sandwich panel material to the desired size, in accordance with need. For example, for a situation in which the panel material is used for the flooring of a truck, the width is preferably 900–1500 mm, and the length is 2000–2400 mm.

For panel material obtained in this way, the proportion of the weights of the FRP molded board (A) and the rigid polyurethane foam (B) is preferably (A)/(B)=15–75/85–25 (% by weight), and more preferably 25–65/35–75 (% by weight).

In addition, in accordance with need, and mainly from the point of view of appearance and durability, a synthetic resin, such as unsaturated polyester type resin, acrylic type resin, urethane type resin, melamine type resin or the like, which has been colored so as to be the same color as the above-mentioned FRP molded board which is the surface material, can also be applied to the surface of the cut edge (the cut surface, and the surface of the cut end of the foam) of the cut panel. In addition, a protective material can also be arranged on all four sides and corners.

The form of the surface of the panel material of the present invention can be curved, flat, or irregular, but a flat surface panel is preferable. This surface may be sanded, and is preferably a surface having small irregularities with a pattern or without a pattern. These sanded surfaces, and irregularities can also serve to prevent slipping.

The form of the pattern of the irregularities in the surface is not particularly limited, but preferably it has indentations of a embossed pattern, straight line pattern, curved line pattern, or lattice pattern, and the width of the grooves is of the level of 0.1–20 mm. In addition, a small form of the above-mentioned irregular pattern may be included within a large circle or square pattern.

As the vehicles for the vehicle flooring material, for example, transportation vehicles such as trucks, buses, railway rolling stock, freight containers, ships, and airplanes can be mentioned, and the platform flooring of freight containers and trucks can be preferably mentioned.

Since the panel material obtained by means of the present invention can be used in the same way as general wood materials, for example, it can be cut using saws, nailed, held by screws and holes can be made in it, it is superior in processability, and the machines, tools, etc., which have been used in the past can be used as they are.

EMBODIMENTS

In the following, the present invention is explained based on the embodiments, and except where otherwise stated, "parts" and "%" are based on weight.

Embodiment 1

Two sheets of chopped strand mat of 450 g/m² as the reinforcing fiber material were overlapped, and impregnated with unsaturated polyester resin, then this unsaturated polyester resin was allowed to cure, and, thereby, FRP molded board A for use in the surface material was obtained. The thickness of this FRP molded board A was 1.5 mm and the proportion of reinforcing fiber material was approximately 40% by weight.

Next, two sheets of FRP molded board A were set into a box shaped mold of 1 m×2.5 m×15 mm maintained at 45° C., rigid polyurethane foam starting material was injected into the space between these FRP molded boards A and allowed to foam, and, thereby, a sandwich panel molded product (having a thickness of 15 mm and a specific gravity of about 0.5) was obtained for which the thickness of the rigid polyurethane foam layer was 12 mm and the density of the rigid polyurethane foam layer was 0.3 g/cm³.

The rigid polyurethane foam starting material used in this case was a combination of crude 4,4'-diphenylmethanediisocyanate (MDI) and a polyol compound comprising 100 parts of a polyhydric alcohol type polyetherpolyol having a hydroxyl value of 450 and prepared using pentaerythritol as an initiator, 1.0 parts of water as a foaming agent, and 0.5 parts of hexamethylenediamine as a catalyst.

The flexural modulus of this rigid urethane foam was 35 kgf/mm², and the reduction in thickness was 20% after the foam had been compressed to 50% deformation and then the compression pressure released.

Next, this sandwich panel was cut to a size of 900×2400 mm and evaluated as flooring for a vehicle. The results are shown in Table 1.

Embodiment 2

Roving cloth having 300 g/m² and in a mesh form, chopped strand mat having 300 g/m², and roving cloth having 300 g/m² and in a mesh form were overlapped in that order as the reinforcing fiber material, they were then impregnated with unsaturated polyester resin, and allowed to harden, and, thereby, FRP molded board B for use as surface material was obtained. The thickness of this FRP molded board B was 1.5 mm and the proportion of reinforcing fiber material was approximately 40% by weight.

Next, two sheets of FRP molded board B were set into a box shaped mold of 1 m×2.5 m×15 mm maintained at 45° C. Rigid polyurethane foam starting material was injected into the space between these FRP molded boards B and allowed to foam, and, thereby, a sandwich panel molded product (having a thickness of 15 mm and a specific gravity of about 0.5) was obtained for which the thickness of the rigid polyurethane foam layer was 12 mm and the density of the rigid polyurethane foam layer was 0.3 g/cm³.

The rigid polyurethane foam starting material used in this case was the same as that used in Embodiment 1. The results are shown in Table 1. The flexural modulus of this rigid urethane foam was 35 kgf/mm², and the reduction in thickness was 20% after the foam had been compressed to 50% deformation and then the compression pressure released.

Next, this sandwich panel was cut to a size of 900×2400 mm and evaluated as flooring for a vehicle. The results are shown in Table 1.

Embodiment 3

Chopped strand mat having 230 g/m², roving cloth having 440 g/m², and chopped strand mat having 230 g/m² were overlapped in that order as the reinforcing fiber material, they were then impregnated with unsaturated polyester resin, and the unsaturated polyester resin allowed to harden, and, thereby, FRP molded board C for use as surface material was obtained. The thickness of this FRP molded board C was 1.5 mm and the proportion of reinforcing fiber material was approximately 40% by weight.

Next, two sheets of FRP molded board C were set into a box shaped mold of 1 m×2.5 m×15 mm maintained at 45° C. Rigid polyurethane foam starting material was injected into the space between these FRP molded boards C and allowed to foam, and, thereby, a sandwich panel molded product (having a thickness of 15 mm and a specific gravity of about 0.5) was obtained for which the thickness of the rigid polyurethane foam layer was 12 mm and the density of the rigid polyurethane foam layer was 0.3 g/cm³.

The rigid polyurethane foam starting material used in this case was a combination of crude 4,4'-diphenylmethanediisocyanate (MDI) and a polyol compound comprising 100 parts of a polyhydric alcohol type polyetherpolyol having a hydroxyl value of 450 and prepared by using pentaerythritol as an initiator, 10 parts of monofluoroethane and 0.5 parts of water as foaming agents, and 0.5 parts of hexamethylenediamine as a catalyst.

The flexural modulus of this rigid urethane foam was 35 kgf/mm², and the reduction in thickness was 20% after the foam had been compressed to 50% deformation and then the compression pressure released.

Next, this sandwich panel was cut to a size of 900×2400 mm and evaluated as flooring for a vehicle. The results are shown in Table 2.

Embodiment 4

Roving cloth having 300 g/m² and in a mesh form, two sheets of chopped strand mat having 450 g/m², and roving cloth having 300 g/m² and in a mesh form were overlapped in that order as the reinforcing fiber material, they were then immersed in unsaturated polyester resin, and allowed to harden, and, thereby, FRP molded board D for use as surface material was obtained. The thickness of this FRP molded board D was 2.5 mm and the proportion of reinforcing fiber material was approximately 40% by weight.

Next, two sheets of FRP molded board D were set into a box shaped mold of 1 m×2.5 m×20 mm maintained at 45° C. Rigid polyurethane foam starting material was injected into the space between these FRP molded boards D and allowed to foam, and, thereby, a sandwich panel molded product (having a thickness of 20 mm and a specific gravity of about 0.55) was obtained for which the thickness of the rigid polyurethane foam layer was 15 mm and the density of the rigid polyurethane foam layer was 0.22 g/cm$^3$.

The rigid polyurethane foam starting material used in this case was the same as that used in Embodiment 1. The results are shown in Table 2. The flexural modulus of this rigid urethane foam was 16 kgf/mm$^2$, and the reduction in thickness was 25% after the foam had been compressed to 50% deformation and then the compression pressure released.

Next, this sandwich panel was cut to a size of 900×2400 mm and evaluated as flooring for a vehicle. The results are shown in Table 2.

Embodiment 5

Chopped strand mat having 450 g/m$^2$, roving cloth having 800 g/m$^2$, and chopped strand mat having 450 g/m$^2$ were overlapped in that order as the reinforcing fiber material, they were then immersed in unsaturated polyester resin, the unsaturated polyester resin allowed to harden, and, thereby, FRP molded board E for use as surface material was obtained. The thickness of this FRP molded board E was 2.8 mm and the proportion of reinforcing fiber material was approximately 45% by weight.

Next, two sheets of FRP molded board E were set into a box shaped mold of 1 m×2.5 m×30 mm maintained at 45° C. Rigid polyurethane foam starting material was injected into the space between these FRP molded boards E and allowed to foam, and, thereby, a sandwich panel molded product (having a thickness of 29.6 mm and a specific gravity of about 0.50) was obtained for which the thickness of the rigid polyurethane foam layer was 24 mm and the density of the rigid polyurethane foam layer was 0.25 g/cm$^3$.

The rigid polyurethane foam starting material used in this case was the same as that used in Embodiment 1. The results are shown in Table 2. The flexural modulus of this rigid urethane foam was 23 kgf/mm$^2$, and the reduction in thickness was 23% after the foam had been compressed to 50% deformation and then the compression pressure released.

Next, this sandwich panel was cut to a size of 900×2400 mm and evaluated as flooring for a vehicle. The results are shown in Table 2.

Comparative Example 1

This was conducted in the same way as Embodiment 1 with the exception that commercially available plywood having a thickness of 15 mm was used as the surface material for Comparative Example 1. In addition, the specific gravity of this plywood was 0.7. The results are shown in Table 1.

Comparative Example 2

This was conducted in the same way as Embodiment 1 with the exception that commercially available aluminum honeycomb panel having a thickness of 15 mm was used as the surface material for Comparative Example 2. In addition, the thickness of the aluminum sheets of the surfaces of this aluminum honeycomb panel were each 1.0 mm, and the specific gravity of this aluminum honeycomb panel was 0.7. The results are shown in Table 1.

Comparative Example 3

Two sheets of FRP molded board A, the same as those used in Embodiment 1, were set into a box shaped mold of 1 m×2.5 m×20 mm maintained at 45° C. Next, rigid polyurethane foam starting material was injected into the space between these FRP molded boards A and allowed to foam, and, thereby, a sandwich panel molded product (having a thickness of 15 mm and a specific gravity of about 0.4) was obtained for which the thickness of the rigid polyurethane foam layer was 12 mm and the density of the rigid polyurethane foam layer was 0.1 g/cm$^3$.

The rigid polyurethane foam starting material used in this case was a combination of crude 4,4'-diphenylmethanediisocyanate (MDI) and a polyol compound comprising 100 parts of a polyhydric alcohol type polyetherpolyol having a hydroxyl value of 450 and prepared by using pentaerythritol as an initiator, 20 parts of monofluoroethane and 2 parts of water as foaming agents, and 0.5 parts of hexamethylenediamine as a catalyst.

The flexural modulus of this rigid urethane foam was 8 kgf/mm$^2$, and the reduction in thickness was 35% after the foam had been compressed to 50% deformation and then the compression pressure released. The results are shown in Table 2.

TABLE 1

|  | Embodiment 1 | Embodiment 2 | Comparative Example 1 | Comparative Example 2 |
|---|---|---|---|---|
| specific gravity of product | 0.5 | 0.5 | 0.7 | — |
| weight of product (Kg/m$^2$) | 7.5 | 7.5 | 10.5 | 8.8 |
| thickness of product (mm) | 15 | 15 | 15 | 15 |
| surface hardness (Shore-A) | 90 | 90 | 50 | 98 |
| flexural strength (Kg/cm$^2$) | 500 | 600 | 500 | 500 |
| compression breaking strength (Kg) | 1500 | 1800 | 950 | 450 |
| repetition compression test | 900 Kg, broke at 4000 times | 900 Kg, no abnormalities at 10,000 times | 900 Kg, broke at 300 times | 900 Kg, broke at first time |
| abrasion resistance (cm$^3$) | 0.09 | 0.09 | 0.35 | — |

TABLE 1-continued

|  | Embodiment 1 | Embodiment 2 | Comparative Example 1 | Comparative Example 2 |
| --- | --- | --- | --- | --- |
| cutting processability | can be cut using normal wood panel saw | can be cut using normal wood panel saw | can be cut using normal wood panel saw | requires special devices for metal processing |
| ability to be held by screw | can be held directly to the frame by screws | can be held directly to the frame by screws | can be held directly to the frame by screws | requires insertion of wood or the like in the screw holding section |
| need for coating | not necessary | not necessary | necessary | not necessary |

Note:
Surface hardness: measured using a Shore-D hardness meter
Compression Breaking and Repetition Compression Tests: the diameter of the indentor was 20 mm; the compression rate was 100 mm/minute
Abrasion Resistance: Taper abrasion test (abrasion wheel H-22, load 1 Kg, 1000 times)
Requirement for Coating: For Comparative Example 1, for the panel as it was, due to problems such as very powerful absorption of water, faster deterioration, and weight increase due to absorption of water, in general, a coating was necessary.

TABLE 2

|  | Embodiment 3 | Embodiment 4 | Embodiment 5 | Comparative Example 3 |
| --- | --- | --- | --- | --- |
| specific gravity of product | 0.5 | 0.55 | 0.5 | 0.4 |
| weight of product (Kg/m$^2$) | 7.5 | 11.0 | 15.0 | 6.0 |
| thickness of product (mm) | 15 | 20 | 29.6 | 15 |
| surface hardness (Shore-A) | 90 | 90 | 90 | 90 |
| flexural strength (Kg/cm$^2$) | 700 | 900 | 1000 | 350 |
| compression breaking strength (Kg) | 1900 | 2100 | 2500 | 700 |
| repetition compression test | 900 Kg, no abnormalities at 10,000 times | 900 Kg, no abnormalities at 10,000 times | 900 Kg, no abnormalities at 10,000 times | 900 Kg, broke at first time |
| abrasion resistance (cm$^3$) | 0.09 | 0.09 | 0.09 | 0.09 |
| cutting processability | can be cut using normal wood panel saw | same as in column to left | same as in column to left | can be cut using normal wood panel saw |
| ability to be held by screw | can be held directly to the frame by screws | same as in column to left | same as in column to left | requires insertion of wood or the like in the screw holding section |
| need for coating | not necessary | not necessary | not necessary | not necessary |

Note:
The measurement conditions for Surface hardness, Compression Breaking and Repetition Compression Tests, and the measurement method for Abrasion Resistance were the same as shown in the "Note" for Table 1.

From the above, it can be understood that the panel material of the present invention has high rigidity at a light weight, is superior in properties for processing and can easily be cut to a desired size.

Industrial Applicability

The present invention provides a panel material which is superior in surface hardness and abrasion resistance due to the use of FRP molded boards as surface material; furthermore, by means of injecting a rigid polyurethane foam starting material into the space between two sheets of FRP molded board, allowing it to foam and, thereby, forming a sandwich panel having a specific density, the panel material is superior in rigidity and in being light weight and the adhesive force at the border between FRP molded board and the foam is strong; and, in addition, the panel material is superior in processing properties such that it can be freely cut to a desired size, and in its ability to be fixed by screws such that it can be held in place by screws. Consequently, the panel material of the present invention is particularly suitable for use as vehicle flooring for trucks, buses, railway rolling stock, freight containers, and the like. In addition, the panel material of the present invention can also be used in a large number of other fields as a replacement for wood panels, for example, for notice boards; panels for use in sports facilities; table tops; all types of flooring; wall materials; and the like.

We claim:

1. A panel material comprising
   (A) two sheets of fiber reinforced plastic (FRP) molded board as upper and lower surface materials; and
   (B) a high density, rigid polyurethane foam as a core material having a density of 0.2–0.5 g/cm$^3$ and a closed cell structure, said high density, rigid polyurethane foam having been obtained by foaming between said two sheets of fiber reinforced plastic molded board, wherein a thermal curable resin of said fiber reinforced plastic molded board (A) is a radical polymerizable unsaturated resin, and sheets of reinforcing fiber material having a fiber weight of 100–800 g/m$^2$ per sheet are used, and a total amount of said reinforcing fiber material per said fiber reinforced plastic molded board is 800–1700 g/m$^2$.

2. A panel material according to claim 1, wherein a specific gravity of said panel material is 0.3 to less than 0.6, and processes of cutting and hole making can be performed on said panel material on site.

3. A panel material according to claim 1, wherein said fiber reinforced plastic molded board (A) includes at least one layer of cloth-form reinforcing fiber material.

4. A panel material according to claim 1, wherein a flexural modulus of said high density, rigid polyurethane foam (B) is 14–200 kgf/mm$^2$, and a reduction in thickness is 10% or greater after said foam has been compressed to 50% deformation and compression pressure released.

5. A panel material according to claim 1, wherein a thickness of said fiber reinforced plastic molded board (A) is 0.6 to less than 3.0 mm per board and a thickness of said rigid urethane foam (B) is 5–24 mm.

6. A panel material as recited in any of claims 1 to 5 wherein said panel material is flooring for a vehicle.

7. A method of manufacturing the panel material of claim 1 comprising:

a process for molding an integrated body wherein a rigid polyurethane foam starting material is injected into a space between two sheets of fiber reinforced plastic molded board set in a mold, and allowed to foam; and a process in which a thus obtained sandwich panel is cut into a desired size.

* * * * *